US012704817B2

(12) United States Patent
Cho et al.

(10) Patent No.: US 12,704,817 B2
(45) Date of Patent: Aug. 11, 2026

(54) WEARABLE ELECTRONIC DEVICE COMPRISING ELECTROPHORETIC ELEMENT

(71) Applicant: SAMSUNG ELECTRONICS CO., LTD., Suwon-si (KR)

(72) Inventors: Minhyun Cho, Suwon-si (KR); Junyoung Kim, Suwon-si (KR); Minyoung Lee, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 281 days.

(21) Appl. No.: 18/658,663

(22) Filed: May 8, 2024

(65) Prior Publication Data

US 2024/0288836 A1 Aug. 29, 2024

Related U.S. Application Data

(63) Continuation of application No. PCT/KR2022/019240, filed on Nov. 30, 2022.

(30) Foreign Application Priority Data

Jan. 26, 2022 (KR) ........................ 10-2022-0011172

(51) Int. Cl.
*G04G 21/02* (2010.01)

(52) U.S. Cl.
CPC .................................. *G04G 21/025* (2013.01)

(58) Field of Classification Search
CPC ....... G04G 21/02; G04G 21/025; G04G 17/04
See application file for complete search history.

(56) References Cited

U.S. PATENT DOCUMENTS

| | | | |
|---|---|---|---|
| 10,234,741 B2 | 3/2019 | Klement et al. | |
| 12,256,812 B1 * | 3/2025 | Crews | A44C 5/0053 |
| 2015/0333088 A1 | 11/2015 | Yamazaki et al. | |
| 2015/0355604 A1 | 12/2015 | Fraser et al. | |

(Continued)

FOREIGN PATENT DOCUMENTS

| | | |
|---|---|---|
| CN | 108600465 A | 9/2018 |
| CN | 113391542 A | 9/2021 |

(Continued)

OTHER PUBLICATIONS

International Search Report (PCT/ISA/210) issued by the International Searching Authority on Mar. 8, 2023 in corresponding International Application No. PCT/KR2022/019240.

(Continued)

*Primary Examiner* — Edwin A. Leon
*Assistant Examiner* — Jason M Collins
(74) *Attorney, Agent, or Firm* — Sughrue Mion, PLLC

(57) ABSTRACT

An electronic device including: a housing configured to be worn on a user's body and including a rear surface and a front surface, with the rear surface configured to contact the user's body; at least one sensor module provided in the housing and configured to receive light incident into the housing through the rear surface; and an electrophoretic element provided at least partially between the rear surface and the at least one sensor module, where the electrophoretic element is configured to receive an electrical signal and transmit or block at least a portion of the light incident into the housing.

15 Claims, 7 Drawing Sheets

(56) References Cited

U.S. PATENT DOCUMENTS

| | | | | |
|---|---|---|---|---|
| 2016/0238918 | A1 | 8/2016 | Nakashima | |
| 2017/0018150 | A1 | 1/2017 | Kim et al. | |
| 2019/0072912 | A1 | 3/2019 | Pandya et al. | |
| 2020/0379308 | A1 | 12/2020 | Yang | |
| 2021/0093209 | A1 | 4/2021 | Chang et al. | |
| 2022/0256720 | A1* | 8/2022 | Takagi | G04G 21/025 |
| 2023/0010168 | A1 | 1/2023 | Jung et al. | |
| 2023/0134896 | A1 | 5/2023 | Guo et al. | |
| 2023/0169788 | A1* | 6/2023 | Kono | H04N 25/78<br>382/124 |

FOREIGN PATENT DOCUMENTS

| | | | |
|---|---|---|---|
| JP | 2016-148795 | A | 8/2016 |
| JP | 2019-20380 | A | 2/2019 |
| KR | 10-2010-0091140 | A | 8/2010 |
| KR | 10-2015-0131978 | A | 11/2015 |
| KR | 10-2017-0009086 | A | 1/2017 |
| KR | 10-2020-0027010 | A | 3/2020 |
| KR | 10-2021-0116944 | A | 9/2021 |
| WO | 2017/205298 | A1 | 11/2017 |

OTHER PUBLICATIONS

Written Opinion (PCT/ISA/237) issued by the International Searching Authority on Mar. 8, 2023 in corresponding International Application No. PCT/KR2022/019240.

* cited by examiner

WEARABLE ELECTRONIC DEVICE COMPRISING ELECTROPHORETIC ELEMENT

CROSS-REFERENCE TO RELATED APPLICATION(S)

This application is a continuation of International Application No. PCT/KR 2022/019240, filed on Nov. 30, 2022, in the Korean Intellectual Property Receiving Office, which is based on and claims priority to Korean Patent Application No. 10-2022-0011172, filed on Jan. 26, 2022, in the Korean Intellectual Property Office, the disclosures of which are incorporated by reference herein in their entireties.

BACKGROUND

1. Field

This disclosure relates to an electronic device wearable on a body, for example, to a wearable electronic device including an electrophoretic element.

2. Description of Related Art

Along with the development of electronics, information, or communication technology, a single electronic device may include a variety of functions. For example, a smartphone may be equipped with functions such as an audio player, a photographing device, or an electronic notebook in addition to a communication function, and even more functions may be realized on the smartphone through installation of additional applications. An electronic device may connect to a server or another electronic device wiredly or wirelessly and receive various information in real time, as well as execute an installed application or a stored file.

As electronic devices have become powerful in performance and miniaturized, it has become commonplace to carry and use them, and portable electronic devices are available in a variety of forms. For example, a single user may use a plurality of portable electronic devices such as a smartphone, a tablet PC, a smart watch, wireless earphones, and/or smart glasses, while carrying them. A wearable electronic device, such as a smart watch, may be carried or used, at least partially in contact with a user's body. For example, a wearable electronic device may be useful in measuring a user's bio-signal, such as a photo plethysmo graph (PPG), sleep zones, skin temperature, a heart rate, or an electrocardiogram.

The above information is presented as background information only to assist with an understanding of the disclosure. No determination has been made, and no assertion is made, as to whether any of the above might be applicable as prior art with regard to the disclosure.

SUMMARY

A wearable electronic device may use an optical sensor as a sensor module to measure a bio-signal. For example, light reflected from a user's body may be received, and the user's bio-signal may be detected based on the received light. In such optical bio-signal detection, the amount of received light may greatly affect the accuracy of the bio-signal detection. However, as the transmittance of externally incident light increases, the internal structures of the wearable electronic device may be visually exposed to the outside. When the light transmittance is reduced in an area corresponding to the sensor module to enhance the appearance of the wearable electronic device, the accuracy of the bio-signal detection may be reduced or the sensor module may consume more power to detect a bio-signal. For example, the accuracy of optical bio-signal detection and the aesthetics of the wearable electronic device may be mutually exclusive.

Various embodiments of the disclosure may address at least the above-mentioned problems and/or disadvantages, and may provide at least the advantages described below. Accordingly, various embodiments of the disclosure may provide a wearable electronic device having a high accuracy in optical bio-signal detection, while having an aesthetic appearance.

Additional aspects according to various embodiments will be presented in the following detailed description, which will become apparent in part from the description or may be understood from the embodiments of the implementations presented.

According to an aspect of an embodiment, an electronic device may include: a housing configured to be worn on a user's body and including a rear surface and a front surface, with the rear surface configured to contact the user's body; at least one sensor module provided in the housing and configured to receive light incident into the housing through the rear surface; and an electrophoretic element provided at least partially between the rear surface and the at least one sensor module, where the electrophoretic element is configured to receive an electrical signal and transmit or block at least a portion of the light incident into the housing.

The electrophoretic element may include: an upper electrode film; a lower electrode film facing the upper electrode film; a transparent electrode provided on at least one of the upper electrode film or the lower electrode film; and electrophoretic particles provided in a space between the upper electrode film and the lower electrode film, where the electrophoretic element is further configured to increase a transmittance of light incident from an outside of the housing by distributing the electrophoretic particles around the transparent electrode, based on an electrical signal applied to the transparent electrode.

The electronic device may further include a processor configured to obtain bio-signal information based on the light received by the at least one sensor module.

The at least one sensor module may include: at least one light emitting element provided in the housing and configured to emit light to an outside of the housing through the rear surface; and at least one photoelectric conversion element provided in the housing and configured to receive the light incident into the housing through the rear surface.

The electrophoretic element may be further configured to transmit or block at least a portion of the light emitted by the at least one light emitting element.

The at least one photoelectric conversion element may be further configured to receive light emitted by the at least one light emitting element and reflected by the user's body.

The electronic device may further include a processor configured to obtain bio-signal information based on the light received by the at least one photoelectric conversion element.

The electrophoretic element may include: an upper electrode film; a lower electrode film facing the upper electrode film; a transparent electrode provided on at least one of the upper electrode film or the lower electrode film; and electrophoretic particles provided in a space between the upper electrode film and the lower electrode film, where the electrophoretic element is further configured to increase a transmittance of light incident from an outside of the housing and the light emitted by the at least one light emitting element by distributing the electrophoretic particles around the transparent electrode, based on an electrical signal applied to the transparent electrode.

The housing may include: a side bezel structure including a metal or a polymer; a front plate provided on the side bezel structure and providing at least a portion of the front surface; and a rear plate provided on the side bezel structure and providing at least a portion of the rear surface.

The electrophoretic element may be provided on an inner surface of the rear plate.

The electronic device may further include at least one wearing member detachably coupled to the side bezel structure and configured to allow the housing to be worn on the user's body, where, when being worn on the user, the rear plate is configured to face or contact the user's body.

The electronic device may further include a processor, where the processor is further configured to: determine whether the housing is being worn on the user's body; based on determining the housing being worn on the user's body, determine whether to measure bio-signal information; based on determining to measure the bio-signal information, increase a transmittance of light incident into the housing by applying the electrical signal to the electrophoretic element; and detect the light incident into the housing using the at least one sensor module.

The processor may be further configured to block the electrical signal applied to the electrophoretic element, based on determining that the housing is not being worn on the user's body, or based on determining not to measure the bio-signal information.

The at least one sensor module may include: at least one light emitting element provided in the housing and configured to emit light to an outside of the housing through the rear surface; and at least one photoelectric conversion element provided in the housing and configured to receive the light incident into the housing through the rear surface.

The processor may be further configured to obtain the bio-signal information based on the light received by the at least one photoelectric conversion element.

BRIEF DESCRIPTION OF DRAWINGS

The above or other aspects, configurations, and/or advantages of various embodiments of the disclosure will be apparent from the following detailed description with reference to the accompanying drawings, in which.

DETAILED DESCRIPTION

Figure 1:
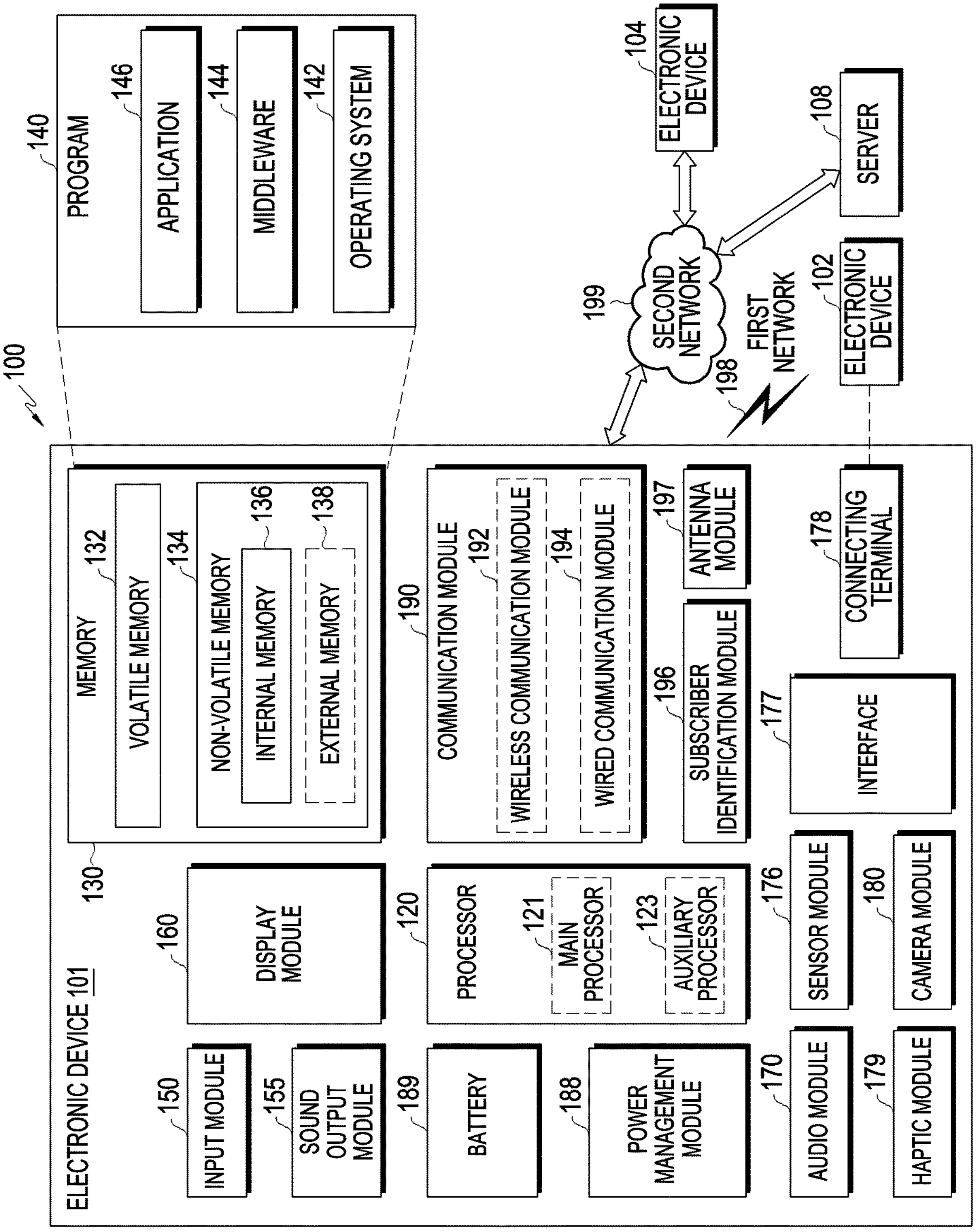
FIG. 1 is a block diagram illustrating an electronic device in a network environment according to various embodiments of the disclosure.

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms. It is to be understood that singular forms include plural referents unless the context clearly dictates otherwise. The terms including technical or scientific terms used in the disclosure may have the same meanings as generally understood by those skilled in the art.

The terms and words used in the following description and claims are not limited to their referential meanings, but may be used to clearly and consistently describe various embodiments of the disclosure. Accordingly, it will be apparent to those skilled in the art that the following description of various embodiments of the disclosure, which is intended to be in conformity with the claims, is provided solely for illustrative purposes, not for restrictive purposes. As used herein, reference to "various embodiments" is intended to describe features that may be present in one or more embodiments.

Unless the context clearly dictates otherwise, it should be understood that the singular forms of "a," "an," and "the" include plural meanings. Thus, for example, a "component surface" may be meant to include one or more of the surfaces of a component.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the strength of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "$1^{st}$" and "$2^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program) including one or more instructions that are stored in a storage medium (e.g., internal memory or external memory) that is readable by a machine (e.g., an electronic device). For example, a processor (e.g., the processor) of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
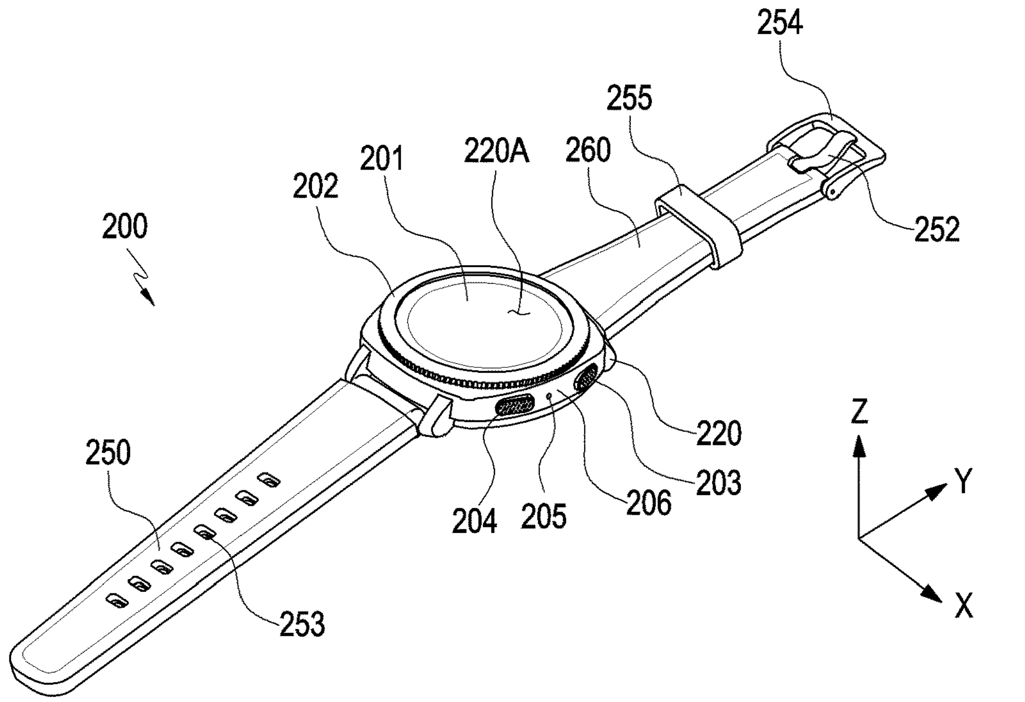
FIG. 2 is a front perspective view illustrating an electronic device according to various embodiments of the disclosure.
Figure 3:
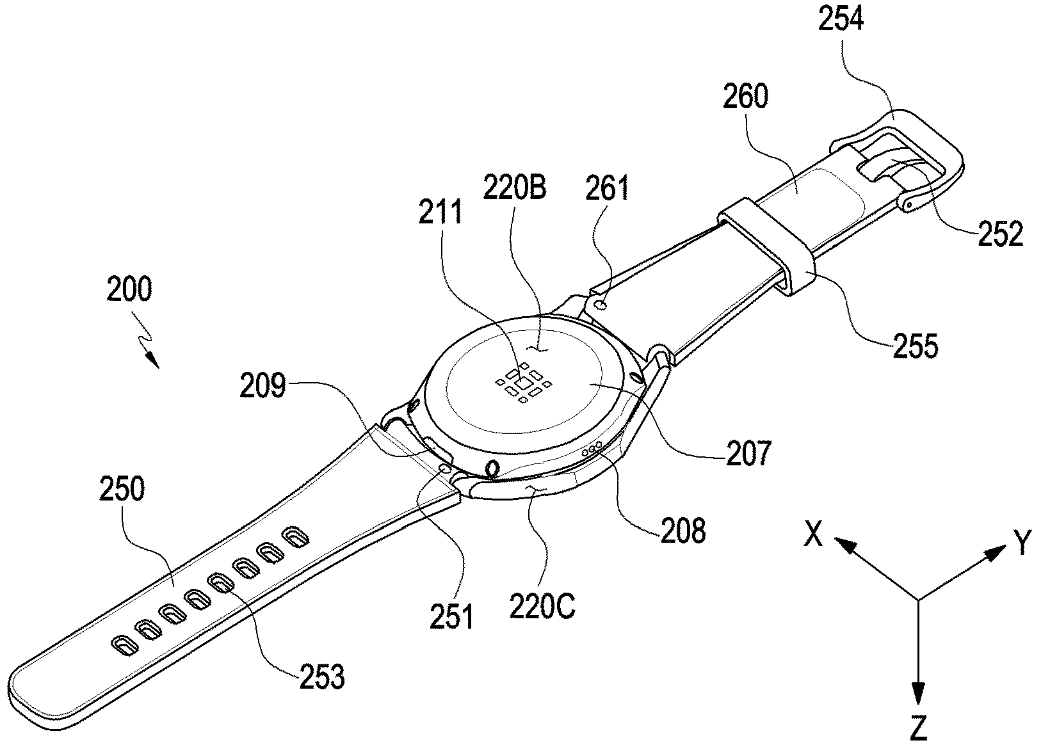
FIG. 3 is a rear perspective view illustrating the electronic device of FIG. 2 according to various embodiments of the disclosure.

FIG. 2 is a front perspective view illustrating an electronic device 200 (e.g., the electronic device 101, 102, or 104 in FIG. 1) according to various embodiments of the disclosure. FIG. 3 is a rear perspective view illustrating the electronic device 200 of FIG. 2.

In the following detailed description, a "width direction or length direction of the electronics 200 or a housing 220" may be any one of an X-axis direction and a Y-axis direction in the illustrated Cartesian coordinate system in FIGS. 2 to 4. When a distinction between the width direction and the length direction is needed, the coordinate axes of the Cartesian coordinate system illustrated in the drawings may be juxtaposed. In the Cartesian coordinate system of FIGS. 2 to 4, a "Z-axis direction" may refer to a thickness direction of the electronic device 200 or the housing 220. In an embodiment, a direction in which a front surface (e.g., a first surface 220A in FIG. 2) of the electronic device 200 or the housing 220 faces may be defined as a "first direction" or a "+Z direction", and a direction in which a rear surface (e.g., a second surface 220B in FIG. 2) of the electronic device 200 or the housing 220 faces may be defined as a "second direction" or a "−Z direction"

Referring to FIGS. 2 and 3, the electronic device 200 may include the housing 220 which includes the first surface (or front surface) 220A, the second surface (or rear surface) 220B, and a side surface 220C surrounding a space between the first surface 220A and the second surface 220B, and wearing members 250 and 260 connected to at least a portion of the housing 220 and configured to detachably fasten the electronic device 200 to a user's body part (e.g., wrist or ankle). In another embodiment, the housing may refer to a structure that forms a portion of the first surface 220A, the second surface 220B, and the side surface 220C of FIG. 1. According to an embodiment, at least a portion of the first surface 220A may be formed by a front plate 201 (e.g., a glass plate or polymer plate including various coating layers) which is at least partially substantially transparent. The second surface 220B may be formed by a substantially opaque rear plate 207. In some embodiments, when the electronic device includes a sensor module 211 disposed on the second surface 220B, the rear plate 207 may include an at least partially transparent area. The rear plate 207 may be formed of, for example, coated or tinted glass, ceramic, a polymer, a metal (e.g., aluminum, stainless steel (STS), or magnesium), or a combination of at least two of these materials. The side surface 220C may be formed by a side bezel structure (or "side member") 206 coupled to the front plate 201 and the rear plate 207 and including a metal and/or a polymer. In some embodiments, the rear plate 207 and the side bezel structure 206 may be integrally formed and include the same material (e.g., a metallic material such as aluminum). The wearing members 250 and 260 may be formed of various materials in various shapes. A woven fabric, leather, rubber, urethane, a metal, ceramic, or a combination of at least two of these materials may be used to form an integrated type and a plurality of unit links to be movable with each other.

According to an embodiment, the electronic device 200 may include at least one of a display (320 in FIG. 4), audio modules 205 and 208, the sensor module 211, key input devices 202, 203 and 204, or a connector hole 209. In some embodiments, the electronic device 200 may not be provided with at least one (e.g., the key input devices 202, 203 and 204, the connector hole 209, or the sensor module 211) of the components or additionally include other components.

The display (e.g., the display 320 in FIG. 4) may be exposed, for example, through a substantial portion of the front plate 201. The shape of the display 320 may correspond to that of the front plate 201, and may be in any of various shapes such as a circle, an oval, or a polygon. The display 320 may be incorporated with or disposed adjacent to a touch sensing circuit, a pressure sensor that measures the intensity (pressure) of a touch, and/or a fingerprint sensor.

The audio modules 205 and 208 may include a microphone hole 205 and a speaker hole 208. A microphone for obtaining an external sound may be disposed in the microphone hole 205, and in some embodiments, a plurality of microphones may be disposed to detect the direction of a sound. The speaker hole 208 may be used as an external speaker and a receiver for calls. In some embodiments, a speaker (e.g., a piezo speaker) may be included without the speaker hole.

The sensor module 211 may generate an electrical signal or data value corresponding to an internal operating state of the electronic device 200 or an external environmental state. The sensor module 211 may include, for example, a biometric sensor module 211 (e.g., an HRM sensor) disposed on the second surface 220B of the housing 220. The electronic device 200 may further include a sensor module such as at least one of a gesture sensor, a gyro sensor, a barometric pressure sensor, a magnetic sensor, an acceleration sensor, a grip sensor, a color sensor, an IR sensor, a biometric sensor, a temperature sensor, a humidity sensor, or an illuminance sensor.

The key input devices 202, 203, and 204 may include a wheel key 202 disposed on the first surface 220A of the housing 220 and rotatable in at least one direction, and/or side key buttons 203 and 204 disposed on the side surface 220C of the housing 220. The wheel key 202 may have a shape corresponding to that of the front plate 201. In another embodiment, the electronic device 200 may not include some or any of the above-mentioned key input devices 202, 203, and 204, and the key input devices 202, 203, and 204 which are not included may be implemented in other forms such as soft keys on the display 320. The connector hole 209 may accommodate a connector (e.g., a USB connector) for transmitting and receiving power and/or data to and from an external electronic device, and include another connector hole for accommodating a connector for transmitting and receiving an audio signal to and from an external electronic device. The electronic device 200 may further include, for example, a connector cover that covers at least a portion of the connector hole 109 and blocks the introduction of a foreign material into the connector hole 109.

The wearing members 250 and 260 may be detachably fastened to at least a partial area of the housing 220 using locking members 251 and 261. The locking members 251 and 261 may include fastening components, such as pogo pins, and may be replaced by protrusion(s) or recess(es) formed on the wear members 250 and 260 according to various embodiments. For example, the wearing members 250 and 260 may be coupled in such a manner that they are engaged with grooves or protrusions formed on the housing 220. The wearing members 250 and 260 may include one or more of a fixing member 252, a fixing member fastening hole 253, a band guide member 254, and a band fixing loop 255.

The fixing member 252 may be configured to fix the housing 220 and the wearing members 250 and 260 to the user's body part (e.g., a wrist or an ankle). The fixing member fastening hole 253 may fix the housing 220 and the wearing members 250 and 260 to the user's body part in correspondence with the fixing member 252. The band guide member 254 may be configured to limit a movement range of the fixing member 252, when the fixing member 252 is fastened in the fixing member fastening hole 253, so that the wearing members 250 and 260 are fastened to the user's body part in close contact. The band fixing loop 255 may limit movement ranges of the wearing members 250 and 260, with the fixing member 252 fastened in the fixing member fastening hole 253.

Figure 4:
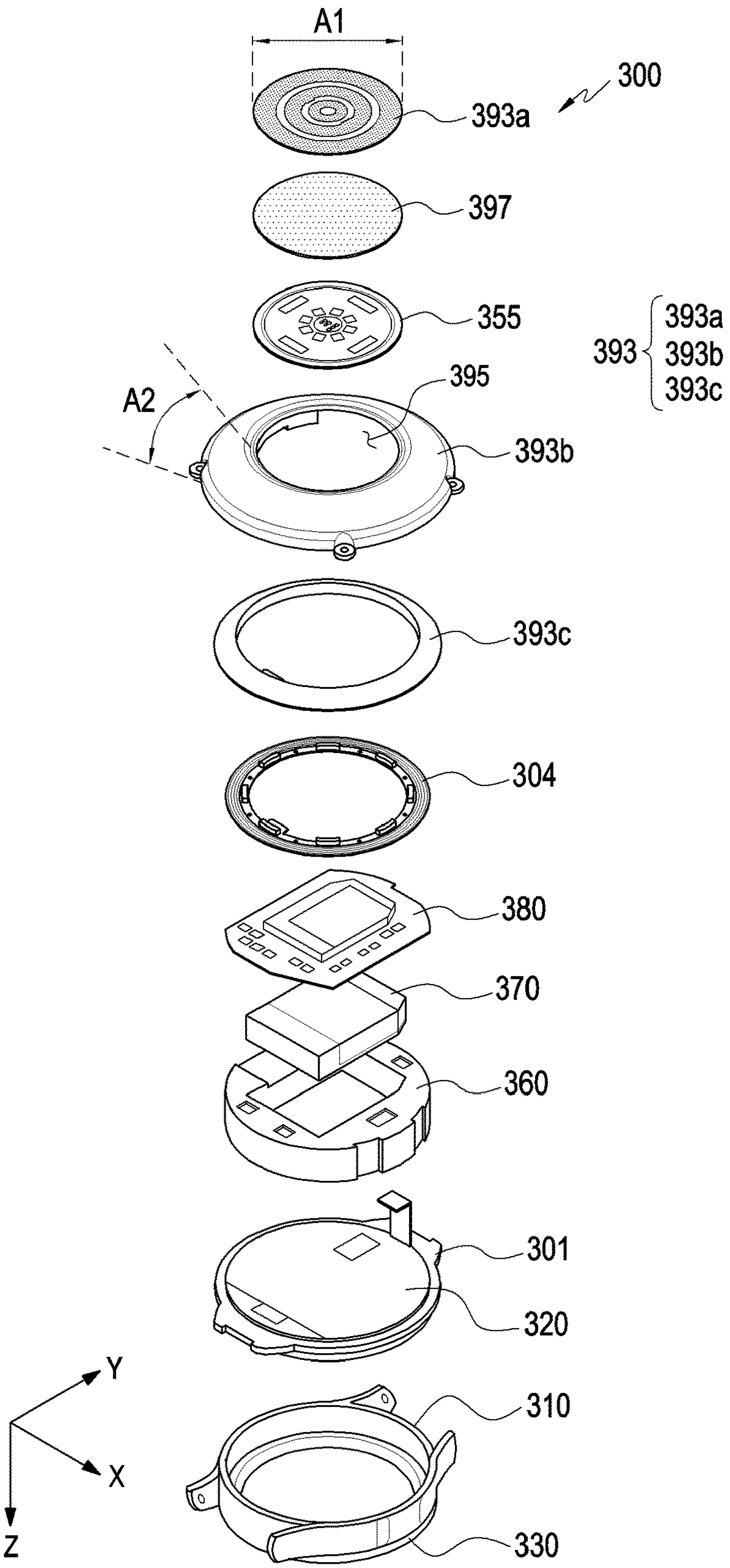
FIG. 4 is an exploded perspective view illustrating the electronic device of FIG. 2 according to various embodiments of the disclosure.
Figure 5:
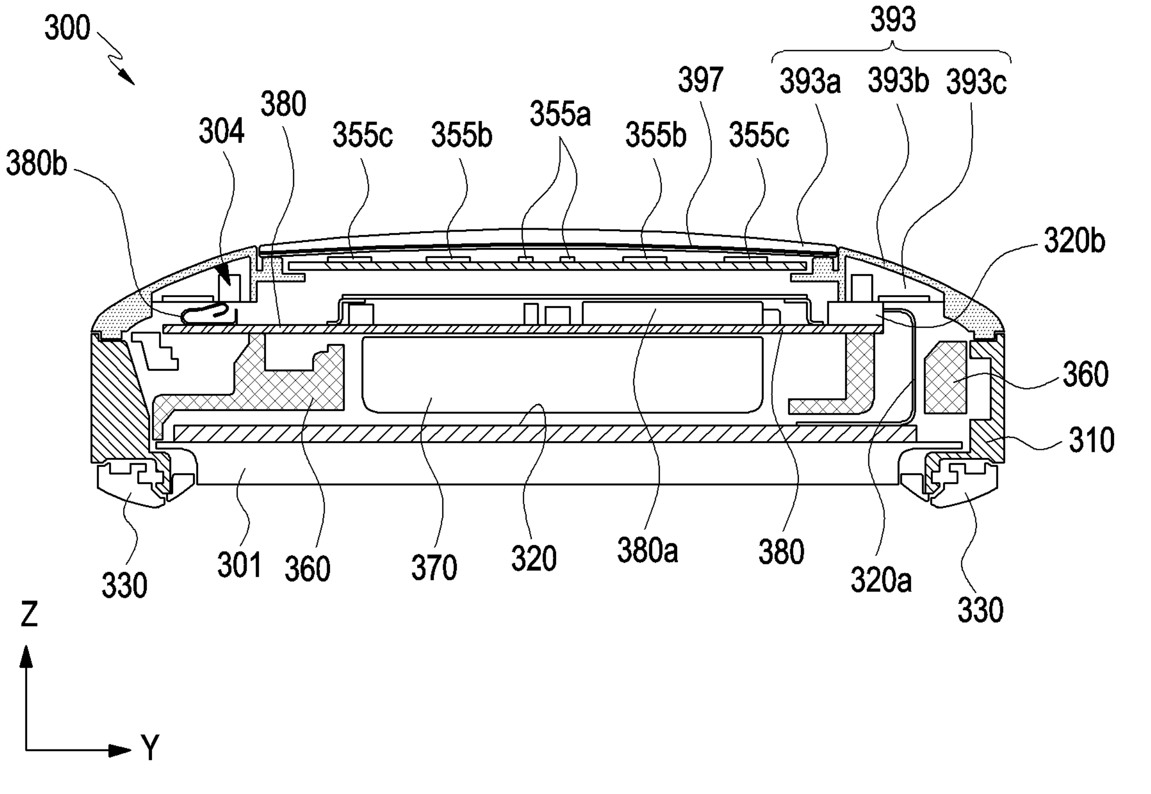
FIG. 5 is a cross-sectional view illustrating a cut portion of a wearable electronic device according to various embodiments of the disclosure.

FIG. 4 is an exploded perspective view illustrating the electronic devices 200 and 300 of FIG. 2. FIG. 5 is a cross-sectional view illustrating a portion of a wearable electronic device 300 (e.g., the electronic device of FIG. 4) according to various embodiments of the disclosure.

Referring further to FIGS. 4 and 5, the electronic device 300 may include a side bezel structure 310, a wheel key 330, a front plate 301 (e.g., the front plate 201 in FIG. 2), the display 320, a first antenna, a second antenna (e.g., a coil assembly 304), a support member 360 (e.g., a bracket), a battery 370, a PCB 380 (e.g., a main circuit board), a sealing member, a rear plate 393, an electrophoretic element 397, and a wearing member (e.g., the wearing members 250 and 260 in FIG. 2 or 3). At least one of the components of the electronic device 300 may be the same as or similar to at least one of the components of the electronic device 200 in FIG. 2 or 3, and redundant descriptions will be omitted. The support member 360 may be disposed inside the electronic device 200 or 300 and connected to the side bezel structure 310, or may be formed integrally with the side bezel structure 310. The support member 360 may be formed of, for example, a metallic material and/or a non-metallic (e.g., polymer) material. The support member 360 may have one surface coupled to the display 320 and the other surface coupled to the PCB 380. A processor (e.g., the processor 120 in FIG. 1), memory (e.g., the memory 130 in FIG. 1), and/or an interface (e.g., the interface 177 in FIG. 1) may be mounted on the PCB 380. The processor may include, for example, at least one of a CPU, an AP, a GPU, an AP sensor processor, or a CP.

The memory may include, for example, volatile memory or non-volatile memory. The interface may include, for example, a high definition multimedia interface (HDMI), a universal serial bus (USB) interface, an SD card interface, and/or an audio interface. For example, the interface may connect the electronic device 200 or 300 to an external electronic device electrically or physically, and include a USB connector, an SD card/MMC connector, or an audio connector.

The battery 370, which is a device to supply power to at least one component of the electronic device 200 or 300, may include, for example, a non-rechargeable primary battery, a rechargeable secondary battery, or a fuel cell. At least a portion of the battery 370 may be disposed, for example, on substantially the same plane as the PCB 380. The battery 370 may be disposed integrally within the electronic device 200 or 300, or may be disposed to be detachable from the electronic device 200 or 300.

When the side bezel structure 310 or the support member 360 includes a metallic material, the first antenna may, for example, use at least a portion of the side bezel structure 310 and/or the support member 360 as a radiating conductor. For example, the processor (e.g., the processor 120 in FIG. 1) or a communication module (e.g., the communication module 190 in FIG. 1) may be configured to perform wireless communication using at least a portion of the side bezel structure 310 and/or the support member 360. In some embodiments, the first antenna may be disposed between the display 320 and the support member 360. The first antenna may include, for example, a near field communication (NFC) antenna, a wireless charging antenna, and/or a magnetic secure transmission (MST) antenna. For example, the first antenna may perform short-range communication with an external device, wirelessly transmit and receive power required for charging, and transmit a short-range communication signal or a self-based signal including payment data. In an embodiment, an antenna structure obtained by a portion or combination of the side bezel structure 310 and/or the support member 360 and an antenna structure disposed between the display 320 and the support member 360 may be formed in combination. In an embodiment, the antenna structure obtained by the side bezel structure 310 and/or the support member 360 and the antenna structure disposed between the display 320 and the support member 360 may be used for wireless communication functions according to different communication protocols.

An auxiliary circuit board 355 may be disposed between the PCB 380 and the rear plate 393 and/or in a space surrounded by the side bezel structure 310. The auxiliary circuit board 355 may include the second antenna, for example, an NFC antenna, a wireless charging antenna, and/or an MST antenna. In various embodiments of the disclosure, the second antenna may be understood as the coil assembly 304 separated from the auxiliary circuit board 355. The PCB 380 and/or the auxiliary circuit board 355 may use the second antenna or the coil assembly 304 to, for example, perform short-range communication with an external device or wirelessly transmit and receive power required for charging, and transmit a short-range communication signal or a self-based signal including payment data. In an embodiment, an antenna structure may be formed by a portion or a combination of the side bezel structure 310 and/or the rear plate 393.

According to various embodiments, when the electronic device 300 (e.g., the electronic device 200 in FIGS. 2 and 3) includes a sensor module (e.g., the sensor module 211 in FIG. 2), a sensor element may be disposed separately from the auxiliary circuit board 355 or a sensor circuit disposed on the auxiliary circuit board 355. The sensor circuit or sensor element may include, for example, a light emitting element, a photoelectric conversion element, or an electrode pad, as a combination of components indicated by '355*a*', '355*b*', and/or '355*c*' in FIG. 5. For example, an electronic component (e.g., the auxiliary circuit board 355 in FIG. 4 or FIG. 5) provided as the sensor module 211 may be disposed between the PCB 380 and the rear plate 393.

According to various embodiments, the rear plate 393 may include a first cover plate 393*a* and a second cover plate 393*b* disposed to surround at least a portion of the first cover plate 393*a*. In some embodiments, when viewed in the Z-axis direction, the second cover plate 393*b* may have a loop shape that forms or defines an opening area 395, and the first cover plate 393*a* may be disposed in the opening area 395. Although the second cover plate 393*b* has a substantially circular shape when viewed in the Z-axis direction in the illustrated embodiment, various embodiments of the disclosure are not limited thereto, and the second cover plate 393*b* may have a polygonal loop shape. In an embodiment, the first cover plate 393*a* may be coupled to the second cover plate 393*b* by an adhesive such as a double-sided tape, or a sealing member, and a sealing structure or a waterproof structure may be formed in the opening area 395, for example, between the first cover plate 393*a* and the second cover plate 393*b*.

According to various embodiments, the electronic device 200 or 300 or the rear plate 393 may further include a molding member 393*c* disposed on an inner surface of the second cover plate 393*b*. According to an embodiment, the molding member 393*c* may be described as a portion of the coil assembly 304. The molding member 393*c* may be molded, for example, of a transparent or translucent synthetic resin. In an embodiment, the molding member 393*c* may be disposed to contact the inner surface of the second cover plate 393*b*, at the same time as the molding member 393*c* is molded by insert injection. In another embodiment, the second cover plate 393*b* and the molding member 393*c* may be manufactured in separate processes and coupled to each other through an assembly or attachment process.

According to various embodiments, the coil assembly 304 may be at least partially embedded in the molding member 393*c* and configured to generate an induced current in response to an external electromagnetic field. In an embodiment, the coil assembly 304 may be electrically connected to the PCB 380 or the auxiliary circuit board 355, and the electronic device 200 or 300 may supply power or charge the battery 370 using the induced current generated by the coil assembly 304. In some embodiments, with the coil assembly 304 disposed in a mold for molding the molding member 393*c*, the molding member 393*c* may be molded. For example, at the same time as the molding member 393*c* is molded, the coil assembly 304 may be coupled or fixed to the molding member 393*c* while being at least partially surrounded by the molding member 393*c*.

According to various embodiments, the auxiliary circuit board 355 may be disposed facing a first area A1 (e.g., the first cover plate 393*a*) of the rear plate 393. For example, when viewed in the Z-axis direction, the auxiliary circuit board 355 may be disposed to correspond to the opening area 395 and surrounded by the second cover plate 393*b* or the molding member 393*c*. In some embodiments, the second cover plate 393*b* may provide a curved area A2 located around the first area A1, and the coil assembly 304 may be disposed in the curved area A2 provided by the second cover plate 393*b* around an area (e.g., the opening area 395 or the first area A1) in which the auxiliary circuit board 355 is disposed.

According to various embodiments, the auxiliary circuit board 355 may include a sensor with a light emitting element 355*a* (see FIG. 5) or photoelectric conversion elements 355*b* and 355*c* (see FIG. 5) combined therein or a sensor (e.g., the sensor module 211 in FIG. 3) using an electrode pad, and the electronic device 200 or 300 may detect a user's bio-signal using this sensor or the sensor module 211 of FIG. 3. For example, the photoelectric conversion elements 355*b* and 355*c* may receive external light incident through the rear plate 393 (e.g., the first cover plate 393*a*). In some embodiments, when the rear plate 393 is in contact with the user's body, the amount of light that the photoelectric conversion elements 355*b* and 355*c* are capable of receiving may be significantly small. When the rear plate 393 is in contact with the user's body, the electronic device 300 or the processor 120 of FIG. 1 may emit light using the light emitting element 355*a*, and light emitted from the light emitting elements 355*a* may be irradiated to the user's body through the rear plate 393 (e.g., the first cover plate 393*a*). The photoelectric conversion elements 355*b* and 355*c* may receive light which has been emitted from the light emitting element 355*a* and reflected from the user's body. Accordingly, even when the rear plate 393 is in contact with the user's body, a sufficient amount of light needed to detect the user's bio-signal may be received.

According to various embodiments, the first cover plate 393*a* may include transparent areas (e.g., transparent areas TA1 and TA2 in FIG. 9) and non-transparent areas (e.g., transparent areas NTA1, NTA2, NTA3 in FIG. 9), which are arranged alternately with each other, and light emitted by the light emitting element 355*a* or light incident on the photoelectric conversion elements 355*b* and 355*c* may pass through any one of the transparent areas. As the non-transparent areas are formed in areas excluding a path through which light passes, internal structures or electrical components of the housing (e.g., the housing 220 in FIG. 2) or the electronic device 300 may be blocked from being visually exposed to the outside. The arrangement of these transparent and non-transparent areas will be described further with reference to FIG. 9.

According to an embodiment, the electrophoretic element 397 may be disposed on the sensor module (e.g., the auxiliary circuit board 355) and the rear surface (e.g., the second surface 220B in FIG. 3 or the rear plate 393 in FIG. 4) of the housing 220, and when receiving an electrical signal, transmit at least a portion of light incident from the outside. For example, the sensor module (e.g., the photoelectric conversion elements 355*b* and 355*c*) may receive light enough to detect a bio-signal. In an embodiment, when an electrical signal is not applied, the electrophoretic element 397 may block internal structures or electrical components of the housing 220 or the electronic device 300 in the transparent area(s) of the first cover plate 393*a* from being visually exposed to the outside by decreasing a light transmittance. The configuration of the electrophoretic element 397 will be described below in more detail with reference to FIGS. 6 to 9.

According to various embodiments, the sensor (e.g., the sensor module 211 in FIG. 3) disposed on or including the auxiliary circuit board 355 may detect user bio-signal information such as a photo plethysmo graph (PPG), sleep zones, skin temperature, a heart rate, or an electrocardiogram, and the detected bio-signal information may be stored in the electronic device 200 or 300 (e.g., the memory 130 in FIG. 1) or transmitted to a medical institution in real time, for use in health management of the user. In transmitting the detected bio-signal information, the processor (e.g., the processor 120 in FIG. 1) and/or the communication module (e.g., the communication module 190 in FIG. 1) may use the above-described antenna, for example, a portion of the side bezel structure 310 or the support member 360, the antenna structure disposed between the display 320 and the support member 360, and/or the coil assembly 304.

A sealing member may be located between the side bezel structure 310 and the rear plate 393. The sealing member may be configured to block moisture and a foreign material from entering a space surrounded by the side bezel structure 310 and the rear plate 393 from the outside. In some embodiments, the sealing member may include a double-sided tape disposed between the side bezel structure 310 and the front plate 301, and/or a rubber O-ring provided between the side bezel structure 310 and the rear plate 393.

According to various embodiments, the electronic device 200 or 300 may include a wireless charging circuit (e.g., the power management module 188 in FIG. 1 and/or a wireless charging circuit provided as a portion of the processor 120 in FIG. 1) and the coil assembly 304. In an embodiment, the coil assembly 304 may generate an induced current in response to an external electromagnetic field, and the wireless charging circuit may supply power to the electronic device 200 or 300 or charge the battery 370, using the induced current generated by the coil assembly 304.

In describing various embodiments below, the electronic devices 101, 102, 104, 200, and 300 in FIGS. 1 to 4 described above may be referred to. The same reference numerals or no reference numerals may be assigned to components that may be understood through the above-described embodiments in the drawings, and a detailed description of the components may also be avoided.

According to an embodiment, the rear plate 393 (e.g., the first cover plate 393*a*), the auxiliary circuit board 355, the coil assembly 304, the PCB 380, the battery 370, the display 320, and/or the front plate 301 may be sequentially arranged in the Z-axis direction, the side bezel structure 310 may be disposed to surround a space between the front plate 301 and the rear plate 393, and the support member 360 may provide a space in which the battery 370 is disposed between the front plate 301 and the rear plate 393 and/or between the display 320 and the PCB 380. In an embodiment, at least some of the components described with reference to FIG. 1 may be disposed on the PCB 380 in the form of electronic component(s) such as an integrated circuit (IC) chip 380*a*.

The electronic device 300 may include a shielding member that alleviates or prevents electromagnetic interference occurring between electronic components, and the shielding member may be disposed to surround at least some of electronic components 380*a* on the PCB 380. In an embodiment, the auxiliary circuit board 355 and/or the display 320 may be electrically connected to the PCB 380 through a wiring structure such as a flexible PCB 320*a* or a connector 320*b*. A connection member 380*b* such as a C-clip may be disposed on the PCB 380 and electrically connect the coil assembly 304 to the PCB 380.

According to various embodiments, a sensor module may be disposed on the auxiliary circuit board 355, facing the first cover plate 393*a*, and according to an embodiment, the auxiliary circuit board 355 may be understood as a portion of the sensor module. According to an embodiment, the light emitting element 355*a* and/or the photoelectric conversion elements 355*b* and 355*c* may be disposed on the auxiliary circuit board 355, and emit light to the outside through the rear plate 393 or receive light which has been transmitted through the rear plate 393 and incident into the housing (e.g., the housing 220 in FIG. 2). For example, the light emitting elements 355*a* may emit near-IR light, IR light, and/or green light, and the photoelectric conversion elements 355*b* and 355*c* may receive or detect light in a specified wavelength band. In an embodiment, when the electronic device 300 is worn on the user's body, the rear plate 393 may be in contact with the user's body, and the photoelectric conversion elements 355*b* and 355*c* may receive light which has been emitted by the light emitting element 355*a* and reflected by the user's body.

According to various embodiments, the electronic device 300 may selectively combine the light emitting element 355*a* and/or the photoelectric conversion element(s) 355*b* and 355*c* and use the combination as a sensor to detect user bio-signal information. In another embodiment, the electronic device 300 may use the photoelectric conversion element(s) 355*b* and 355*c* as a sensor to detect user bio-signal information without using the light emitting element 355. In another embodiment, the electronic device 300 may include a pressure sensor as a sensor to detect user bio-signal information. In some embodiments, the first cover plate 393*a* may transmit at least a portion of light emitted or received by the light emitting element 355*a* and the photoelectric conversion elements 355*b* and 355*c*. In another embodiment, depending on whether an electrical signal is applied, the electrophoretic element 397 may transmit or block at least a portion of light emitted or received by the light emitting element 355*a* and the photoelectric conversion element(s) 355*b* and 355*c*.

Figure 6:
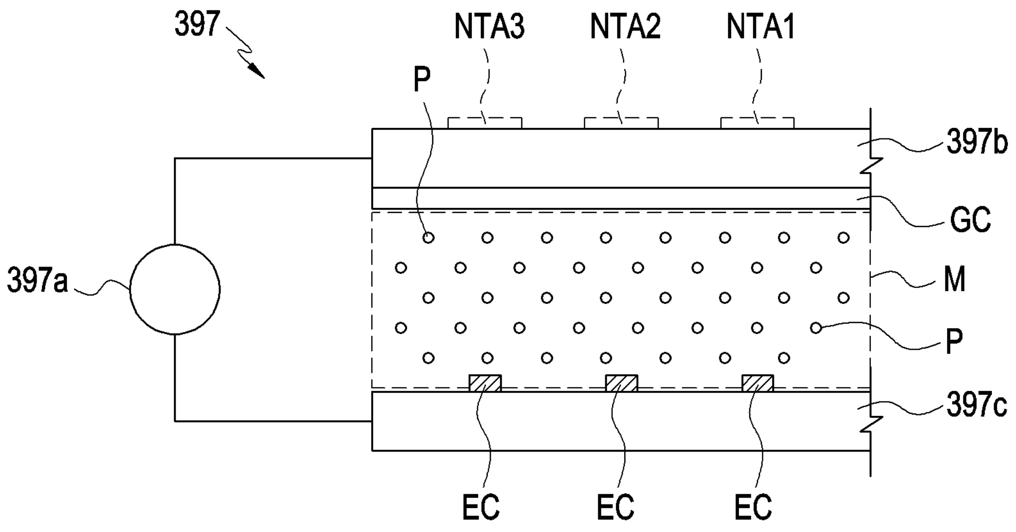
FIG. 6 is a block diagram illustrating the structure of an electrophoretic element in a wearable electronic device according to various embodiments of the disclosure.
Figure 7:
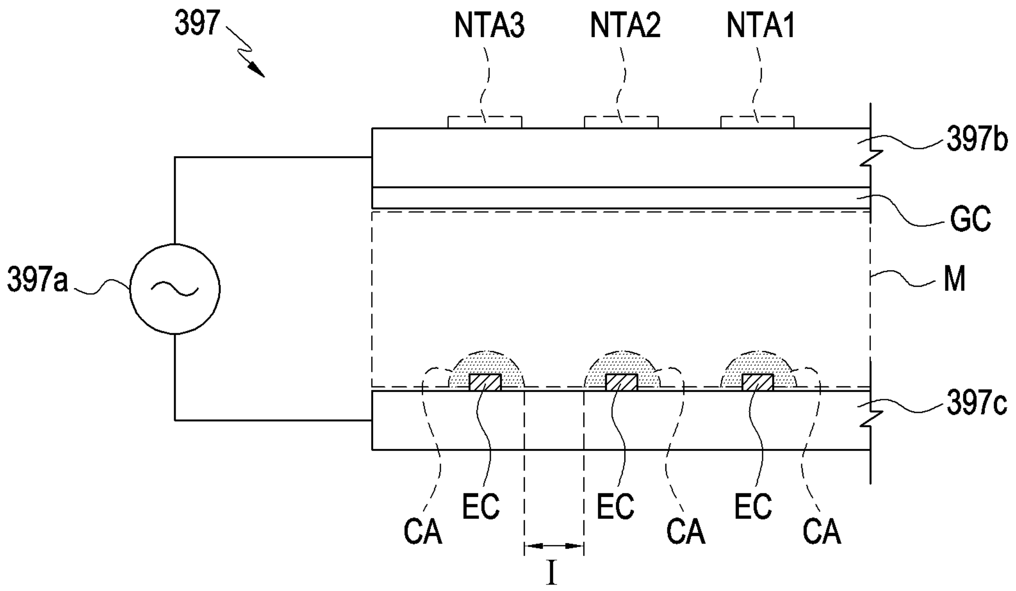
FIG. 7 is a block diagram illustrating a state in which an electrical signal is applied to an electrophoretic element in a wearable electronic device according to various embodiments of the disclosure.

FIG. 6 is a configuration diagram illustrating the structure of the electrophoretic element 393 in a wearable electronic device (e.g., the electronic device 300 in FIG. 4 or FIG. 5) according to various embodiments of the disclosure. FIG. 7 is a configuration diagram illustrating a state in which an electrical signal is applied to the electrophoretic element 393 in the wearable electronic device 300 according to various embodiments of the disclosure.

Referring further to FIGS. 6 and 7, the electrophoretic element 397 may include an upper electrode film 397*b*, a lower electrode film 397*c*, transparent electrodes GC and EC disposed on at least one of the upper electrode film 397*b* or the lower electrode film 397*c*, and/or electrophoretic particles P. The lower electrode film 397*c* may be disposed to face the upper electrode film 397*b*, and a medium M in a liquid phase or gel phase to which the electrophoretic particles P are added may be sealed in a space between the upper electrode film 397*b* and the lower electrode film 397*c*. For example, the electrophoretic particles P may be accommodated in the space between the upper electrode film 397*b* and the lower electrode film 397*c*. According to an embodiment, the electrophoretic particles P may be charged and thus move toward an electrode of an opposite charge within an electric field. For example, when an electrical signal is applied from a power supply or a controller 397*a* (e.g., the processor 120, the power management module 188, or the battery 189 in FIG. 1) and thus a potential difference occurs between the upper electrode film 397*b* and the lower electrode film 397*c*, the electrophoretic particle(s) P may be distributed in an area (e.g., an area indicated by 'CA' in FIG. 7) surrounding any one of the transparent electrodes GC and EC.

According to various embodiments, the electrophoretic particles P may absorb, scatter, or reflect light, and thus at least a portion of light incident on the electrophoretic element 397 may be absorbed, scattered, or reflected by the electrophoretic particles P. In an embodiment, the transparent electrodes GC and EC may be formed of an electrical conductor such as indium-tin oxide (ITO) and have a width too small to be discerned with the naked eye. In another embodiment, the transparent electrodes GC and EC may include a first conductor GC disposed on the upper electrode film 397*b* and a second conductor EC disposed on the lower electrode film 397*c*. The first conductor GC may function, for example, as a ground conductor, and as an electrical signal is applied to the electrophoretic element 397, a potential difference may occur between the upper electrode film 397*b* and the lower electrode film 397*c* or between the first electrode GC and the second electrode EC.

According to various embodiments, the electronic device 300 or the processor (e.g., the processor 120 in FIG. 1) may apply an electrical signal (e.g., a voltage) to the electrophoretic element 397 (e.g., the first conductor GC and the second conductor EC), and as the electrical signal is applied, the electrophoretic particle(s) P may move to one of the transparent electrodes GC and EC and be distributed adjacent to any one (e.g., the second electrode EC) of the transparent electrodes GC and EC. For example, in a state where an electrical signal is not applied, the electrophoretic particles P may be distributed evenly in the space between the upper electrode film 397*b* and the lower electrode film 397*c*, and when an electrical signal is applied, the electrophoretic particle(s) P may be distributed around the second electrode EC (e.g., the area indicated by 'CA' in FIG. 7). In an embodiment, with an electrical signal applied, the distribution density of the electrophoretic particle(s) P may be decreased in an area (e.g., a gap indicated by 'I' in FIG. 7) that is a certain distance away from the second electrode EC, thereby increasing the transmittance of the electrophoretic element 397 for light emitted from the light emitting element 355*a* or light incident from the outside.

According to various embodiments, the rear plate 393 (e.g., the first cover plate 393*a*) may include non-transparent areas (e.g., the non-transparent areas NTA1, NTA2, and NTA3 in FIG. 9) formed by printing, painting, and/or deposition, and the transparent electrodes GC and EC of the electrophoretic element 397, for example, the second electrode(s) EC may be disposed to correspond to the non-transparent areas of the rear plate 393. According to an embodiment, the area (e.g., the area indicated by CA' in FIG. 7) where the electrophoretic particle(s) P is distributed when the electrical signal is applied may be located to correspond to a non-transparent area of the rear plate 393 or the first cover plate 393*a*. For example, the transmittance of the electrophoretic element 397 in portions corresponding to the transparent areas (e.g., the transparent areas TA1 and TA2 in FIG. 9) of the first cover plate 393*a* may be higher when an electrical signal is applied to the electrophoretic element 397 than when no electrical signal is applied. In an embodiment, the gap I of FIG. 7 may be disposed to correspond to any one of the transparent areas of the first cover plate 393*a*, and the sensor module (e.g., the light emitting element 355*a* and the photoelectric conversion elements 355*b* and 355*c* in FIG. 5) may emit or receive light through any one of the transparent areas of the first cover plate 393*a* and/or through the gap I in FIG. 7. For example, depending on whether an electrical signal is applied, the electrophoretic element 397 may visually conceal the internal structures of the housing 220, or provide an environment in which the sensor module (e.g., the photoelectric conversion elements 355*b* and 355*c* in FIG. 5) is capable of receiving sufficient light.

Figure 8:
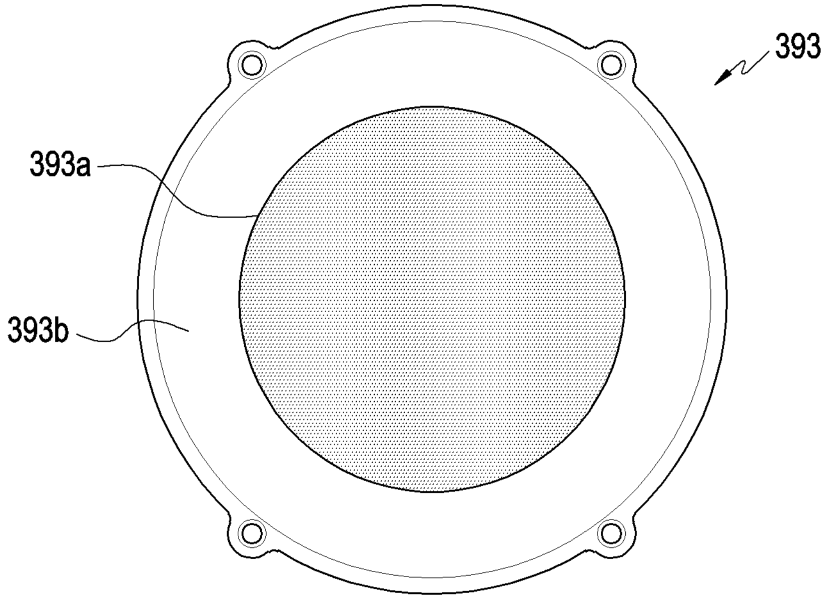
FIG. 8 is a plan view illustrating a state in which an electrophoretic element is turned off, when viewed from the outside of a rear plate of an electronic device according to various embodiments of the disclosure.
Figure 9:
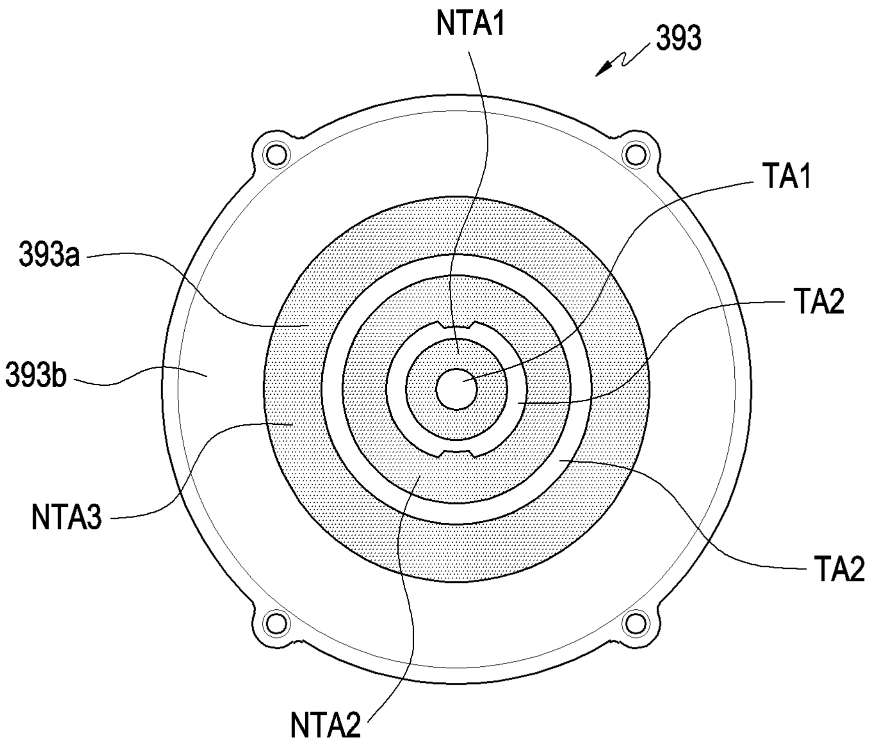
FIG. 9 is a plan view illustrating a state in which an electrophoretic element is turned on, when viewed from the outside of a rear plate of an electronic device according to various embodiments of the disclosure.

FIG. 8 is a plan view illustrating a state in which an electrophoretic element (e.g., the electrophoretic element 397 in FIGS. 3 to 7) is off, when viewed from the outside of the rear plate 393 in an electronic device (e.g., the wearable electronic device 300 in FIG. 4 or 5) according to various embodiments of the disclosure. FIG. 9 is a plan view illustrating a state in which the electrophoretic element 397 is on, when viewed from the outside of the rear plate 393 in the electronic device 300 according to various embodiments of the disclosure.

Referring further to FIG. 8 in conjunction with FIG. 6, with the electrophoretic element 397 off, the electrophoretic particles P may be evenly distributed in the space between the electrode films 397*b* and 397*c*, and the transmittance of at least visible light may be approximately 30% or less. For example, when viewed from the outside of the rear plate 393, the first cover plate 393*a* may appear substantially opaque. Although the first cover plate 393*a* is shaded in FIG. 8 for ease of illustration, with no electrical signal applied to the electrophoretic element 397, the first cover plate 393*a* may provide a color or texture that is substantially in harmony with the housing 220 or the rear plate 393, when viewed from the outside of the rear plate 393.

Referring further to FIG. 9 in conjunction with FIG. 7, when an electrical signal is applied and the electrophoretic element 397 is turned on, the electrophoretic particles P may migrate to an area around the transparent electrode(s) GC and EC (e.g., the second electrode(s) EC in FIG. 7) (e.g., the area indicated by 'CA' in FIG. 7), while the electrophoretic particles P may be substantially free of electrophoretic particles P in the remaining area, for example, at least the gap indicated by 'I'. In an embodiment, the area indicated by 'CA' may be located substantially in one of the non-transparent area(s) NTA1, NTRA2, and NTA3 of the first cover plate 393*a*, and the gap I may be located to correspond to any one of the transparent area(s) TA1 and TA2 of the first cover plate 393*a*. For example, when an electrical signal is applied to the electrophoretic element 397, the first cover plate 393*a* or the electrophoretic element 397 may transmit light emitted from the light emitting element 355*a* and/or light incident from an external source. In an embodiment, when an electrical signal is applied to the electrophoretic element 397, the electrophoretic element 397 may have a transmittance greater than about 30%, for example, about 80%, at least for visible light. For example, when an electrical signal is applied, the electrophoretic element 397 may have a higher transmittance of light than when no electrical signal is applied, and the transmittance may be controlled in a range between about 30% and about 80% by a potential difference between the transparent electrodes GC and EC. In some embodiments, the transmittance of the electrophoretic element 397 may be understood as a transmittance for light emitted from the light emitting element 355*a* and/or light incident from the outside.

According to various embodiments, when the transmittance of the electrophoretic element 397 is approximately 80%, the internal structures or electrical components (e.g., the light emitting element 355*a* and/or the photoelectric conversion elements 355*b* and 355*c* in FIG. 5) of the housing 220 or the electronic device 300 may be visually exposed to the outside through the transparent areas TA1 and TA2 of the first cover plate 393*a*. However, when the user is wearing the housing 220 or the electronic device 300, the rear plate 393 or the first cover plate 393*a* may be in substantial contact with the user's body, and thus the internal structures or electrical components of the housing 220 or the electronic device 300 may be visually concealed. When the housing 220 or the electronic device 300 is not worn on the user's body, the electronic device 300 or the processor 120 of FIG. 1 may block an electrical signal applied to the electrophoretic element 397, and the electrophoretic element 397 may have a transmittance of at least approximately 30% or less for visible light. For example, in an environment where the first cover plate 393*a* is visually exposed to the outside, the electrophoretic element 397 may visually conceal the internal structures or electrical components of the housing 220 or the electronic device 300 by substantially blocking visible light.

Figure 10:
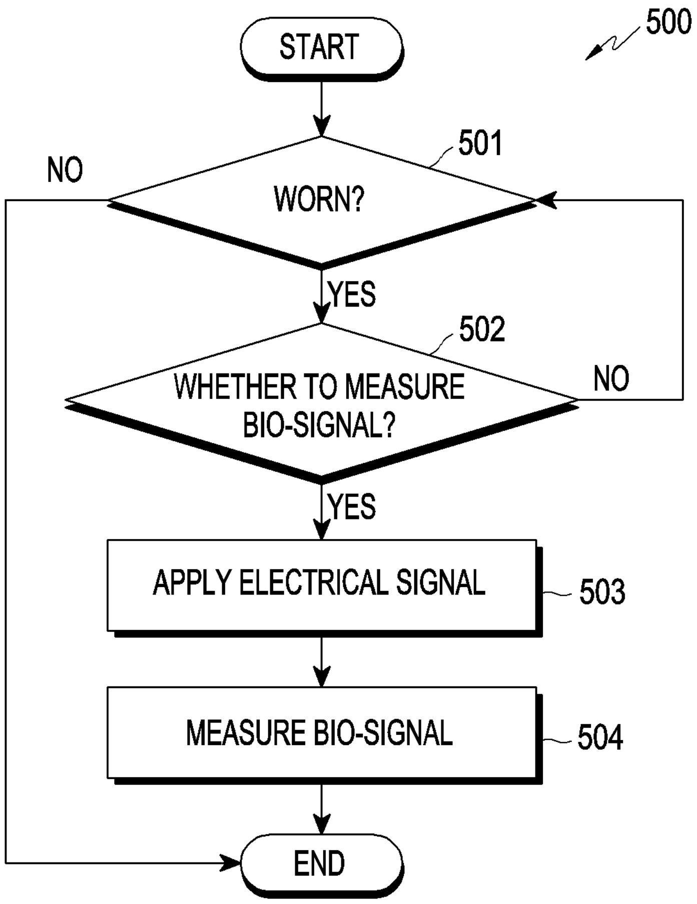
FIG. 10 is a flowchart illustrating a method of measuring a bio-signal in an electronic device according to various embodiments of the disclosure.

Referring now to FIG. 10, a method 500 of measuring a bio-signal in an electronic device (e.g., the electronic device 101, 102, 104, 200, or 300 in FIGS. 1 to 5) will be described. According to an embodiment, the processor 120 of FIG. 1 may obtain a user bio-signal based on light received through a sensor module (e.g., the photoelectric conversion elements 355*b* and 355*c* in FIG. 5), which may be configured to adjust the transmittance of an electrophoretic element (e.g., the electrophoretic element 397 in FIGS. 4 to 7) or to emit light using a light emitting element (e.g., the light emitting element 355*a* in FIG. 5), according to an embodiment. Depending on the transmittance of the electrophoretic element 397 or control of the light emitting element 355, the photoelectric conversion elements 355*b* and 355*c* may receive a sufficient amount of light to obtain bio-signal information. In an embodiment, the processor 120 may be configured to apply an electrical signal to the electrophoretic element 397, when a condition that a housing (e.g., the housing 220 in FIG. 2) or the electronic device (e.g., the electronic device 101, 102, 104, 200, or 300 in FIGS. 1 to 5) is worn on a user's body, and a condition for performing a bio-signal measurement are met.

FIG. 10 is a flowchart illustrating the method 500 of measuring a bio-signal in the electronic device (e.g., the electronic device 101, 102, 104, 200, or 300 in FIGS. 1 to 5) according to various embodiments of the disclosure.

Referring to FIG. 10, in measuring a bio-signal of a user, the electronic device 300 or the processor 120 may be configured to determine whether the electronic device 300 or the housing 220 is worn on the body of a user in operation 501, determine whether to measure bio-signal information in operation 502, apply an electrical signal to the electrophoretic element 397 in operation 503, and/or detect light incident into the housing 220 (e.g., measure a bio-signal) in operation 504. In some embodiments, the preceding and following relationship between operation 501 and operation 502 may differ from the example illustrated in FIG. 10. When operation 502 precedes operation 501, it is determined to measure a bio-signal in operation 502, and then it is determined the housing 220 is not worn on the user's body in operation 501, the electronic device 300 or the processor 120 may be configured to visually, audibly, and/or tactilely output information to guide the user to wear the housing 220, using the display module 160, the audio module 170, and/or the haptic module 179 of FIG. 1.

According to various embodiments, in operation 501 for determining whether the housing 220 or the electronic device 300 is worn on the user's body, the electronic device 300 or the processor 120 may detect or determine whether the housing 220 is worn, using the sensor module 176 of FIG. 1 (e.g., a grip sensor, a proximity sensor, a temperature sensor, or an illuminance sensor). When determining that the housing 220 or the electronic device 300 is not worn on the user's body, the electronic device 300 or the processor 120 may end the bio-signal measurement, and when determining that the housing 220 or the electronic device 300 is worn, may perform operation 502 or operation 503.

According to various embodiments, in operation 502 for determining whether to measure a bio-signal, the processor 120 or the electronic device 300 may determine to perform a bio-signal measurement at a preset measurement time or in response to a user input. In an embodiment, when determining that the housing 220 or the electronic device 300 is not worn on the user's body or that a bio-signal measurement is not to be performed in operation 501 or operation 502, the processor 120 or the electronic device 300 may not apply an electrical signal to the electrophoretic element or block an already applied electrical signal.

According to various embodiments, in operation 503 for applying an electrical signal to the electrophoretic element 397, an environment in which the photoelectric conversion elements **355*b* and 355*c* are capable of receiving a sufficient amount of light may be created. Before an electrical signal is applied to the electrophoretic element 397, or with the applied electrical signal blocked, the first cover plate 393*a* and/or the electrophoretic element 397 may be in a substantially opaque state, as illustrated in FIG. 8. In this case, the amount of light that may be incident on the photoelectric conversion elements 355*b* and 355*c* may be limited. The processor 120 or the electronic device 300 may increase a transmittance for light incident from the outside, at least in the area where the photoelectric conversion elements 355*b* and 355*c* are disposed by applying an electrical signal to the electrophoretic element 397. For example, various embodiments of the disclosure may use the electrophoretic element 397 to conceal the internal structures of the housing 220 or the electronic device 300, while still providing an environment in which the photoelectric conversion elements 355*b* and 355*c*** are capable of receiving a sufficient amount of light during bio-signal measurement.

According to various embodiments, in operation 504 for measuring a bio-signal, the processor 120 or the electronic device 300 may detect a bio-signal based on light received from the photoelectric conversion elements **355*b* and 355*c*. According to an embodiment, when the housing 220 or the electronic device 300 is worn on the user's body, the first cover plate 393*a* is substantially in contact with the user's body. Accordingly, the amount of light incident on the photoelectric conversion elements 355*b* and 355*c* may be insufficient to measure a bio-signal. In this case, the processor 120 or the electronic device 300 may emit light using the light emitting element 355*a*, and the light emitted from the light emitting element 355*a* may be reflected by the user's body and incident on the photoelectric conversion elements 355*b* and 355*c***.

According to various embodiments, the bio-signal measurement, for example, operation 504 may be performed transiently or continuously for a specified period of time based on an input or request from the user. For example, the processor 120 or the electronic device 300 may perform a one-time measurement, when receiving a user input, and the bio-signal measurement may last for at least tens of minutes or up to several hours, to obtain information about the user's physical activity. In another example, the bio-signal measurement may be performed continuously for about 6 to 10 hours to obtain information about the user's sleep status. The processor 120 or the electronic device 300 may determine the magnitude or duration of the electrical signal and control the electrophoretic element 397, based on information to be obtained, a measurement mode, or the amount of light received by the photoelectric conversion elements **355*b* and 355*c*. In some embodiments, the processor 120 or the electronic device 300 may control the light emitting element 355*a* based on the information to be obtained, the measurement mode, or the amount of light received by the photoelectric conversion elements 355*b* and 355*c***.

According to various embodiments, the transmittance of the electrophoretic element 397 may be adjusted in a range from about 30% to about 80% in a path in which light is transmitted by the light emitting element **355*a* or incident on the photoelectric conversion elements 355*b* and 355*c*. For example, when no bio-signal measurement is performed or the first cover plate 393*a* is exposed to an external environment, no electrical signal is applied to the electrophoretic element 397, and the transmittance of the electrophoretic element 397 may be about 30%. In this state, the electrophoretic element 397 may conceal the internal structures of the housing 220 or the electronic device 300. When measuring a bio-signal, the processor 120 or the electronic device 300 may be configured to apply an electrical signal to the electrophoretic element 397, such that the transmittance of the electrophoretic element 397 is increased to about 80% in an area in which light emitted by the light emitting element 355*a* is transmitted and/or an area in which light incident on the photoelectric conversion elements 355*b* and 355*c* is transmitted. For example, the power consumption of the light emitting element 355*a* in radiating light to the outside may be reduced, and the photoelectric conversion elements 355*b* and 355*c* may receive a sufficient amount of light to measure a bio-signal. In some embodiments, the accuracy of the bio-signal measurement may be improved by ensuring that the photoelectric conversion elements 355*b* and 355*c*** receive a sufficient amount of light.

As described above, according to various embodiments of the disclosure, a wearable electronic device (e.g., the electronic device 101, 102, 104, 200, or 300 in FIGS. 1 to 5) may include a housing (e.g., the housing 220 in FIG. 2) configured to be worn on a user's body with a rear surface of a front surface (e.g., the first surface 220A in FIG. 2) and the rear surface (e.g., the second surface 220B in FIG. 3) in contact with the user's body, at least one sensor module (e.g., the sensor module 176 or 211 in FIG. 1 or FIG. 3 and the auxiliary circuit board 355 in FIG. 4 or FIG. 5) accommodated in the housing and configured to receive light incident into the housing through the rear surface, and an electrophoretic element (e.g., the electrophoretic element 397 in FIGS. 4 to 7) disposed at least partially between the rear surface and the sensor module. The electrophoretic element may be configured to receive an electrical signal and transmit or block at least a portion of the light incident into the housing.

According to various embodiments, the electrophoretic element may include an upper electrode film (e.g., the upper electrode film 397*b* in FIG. 6 or FIG. 7), a lower electrode film (e.g., the lower electrode film 397*c* in FIG. 6 or FIG. 7) disposed to face the upper electrode film, a transparent electrode (e.g., the transparent electrodes GC and EC in FIG. 6 or FIG. 7) disposed on at least one of the upper electrode film or the lower electrode film, and electrophoretic particles (e.g., the electrophoretic particles P in FIG. 6) accommodated in a space between the upper electrode film and the lower electrode film. The electrophoretic element may be configured to increase a transmittance for light incident from an outside of the housing by distributing the electrophoretic particles around the transparent electrode (e.g., in the area indicated by 'CA' in FIG. 7), as an electrical signal is applied to the transparent electrode.

According to various embodiments, the wearable electronic device may further include a processor (e.g., the processor 120 in FIG. 1) configured to obtain bio-signal information based on the light received by the sensor module.

According to various embodiments, the sensor module may include at least one light emitting element (e.g., the light emitting element 355*a* in FIG. 5) accommodated in the housing and configured to emit light to an outside of the housing through the rear surface, and at least one photoelectric conversion element (e.g., the photoelectric conversion elements 355*b* and 355*c* in FIG. 5) accommodated in the housing and configured to receive the light incident into the housing through the rear surface.

According to various embodiments, the electrophoretic element may be configured to transmit or block at least a portion of the light emitted by the light emitting element.

According to various embodiments, the photoelectric conversion element may be configured to receive light emitted by the light emitting element and reflected by the user's body.

According to various embodiments, the wearable electronic device may further include a processor configured to obtain bio-signal information based on the light received by the photoelectric conversion element.

According to various embodiments, the electrophoretic element may include an upper electrode film, a lower electrode film disposed to face the upper electrode film, a transparent electrode disposed on at least one of the upper electrode film or the lower electrode film, and electrophoretic particles accommodated in a space between the upper electrode film and the lower electrode film. The electrophoretic element may be configured to increase a transmittance for light incident from an outside of the housing or light emitted by the light emitting element by distributing the electrophoretic particles around the transparent electrode, as an electrical signal is applied to the transparent electrode.

According to various embodiments, the housing may include a side bezel structure (e.g., the side bezel structure 310 in FIG. 4) including a metal or a polymer, a front plate (e.g., the front plate 201 or 301 in FIG. 2 or FIG. 4) disposed on the side bezel structure and providing at least a portion of the front surface, and a rear plate (e.g., the rear plate 393 in FIG. 4, FIG. 5, FIG. 8, and/or FIG. 9) disposed on the side bezel structure and providing at least a portion of the rear surface.

According to various embodiments, the electrophoretic element may be disposed on an inner surface of the rear plate.

According to various embodiments, the wearable electronic device may further include at least one wearing member (e.g., the wearing members 250 and 260 in FIG. 2 or FIG. 3) detachably coupled to the side bezel structure, and configured to allow the housing to be worn on the user's body. When worn on the user's body, the rear plate may be disposed to face or contact the user's body.

According to various embodiments, the wearable electronic device may further include a processor, and the processor may be configured to determine whether the housing is worn on the user's body (e.g., operation 501 in FIG. 10), when determining that the housing is worn on the user's body, determine whether to measure bio-signal information ((e.g., operation 502 in FIG. 10), when determining to measure the bio-signal information, increase a transmittance for light incident into the housing by applying an electrical signal to the electrophoretic element (e.g., operation 503 in FIG. 10), and detect the light incident into the housing using the sensor module (e.g., operation 504 in FIG. 10).

According to various embodiments, the processor may be configured to block the electrical signal applied to the electrophoretic element, when determining that the housing is not worn on the user's body, or when determining not to measure the bio-signal information.

According to various embodiments, the sensor module may include at least one light emitting element accommodated in the housing and configured to emit light to an outside of the housing through the rear surface, and at least one photoelectric conversion element accommodated in the housing and configured to receive the light incident into the housing through the rear surface.

According to various embodiments, the processor may be configured to obtain the bio-signal information based on the light received by the photoelectric conversion element.

According to various embodiments of the disclosure, an electronic device (e.g., the electronic device 101, 102, 104, 200, or 300 in FIGS. 1 to 5) may include a housing (e.g., the housing 220 in FIG. 2) configured to be worn on a user's body with a rear surface of a front surface (e.g., the first surface 220A in FIG. 2) and the rear surface (e.g., the second surface 220B in FIG. 3) in contact with the user's body, at least one sensor module (e.g., the sensor module 176 or 211 in FIG. 1 or FIG. 3 and the auxiliary circuit board 355 in FIG. 4 or FIG. 5) accommodated in the housing and configured to receive light incident into the housing through the rear surface, an electrophoretic element (e.g., the electrophoretic element 397 in FIGS. 4 to 7) disposed at least partially between the rear surface and the sensor module, and a processor (e.g., the processor 120 in FIG. 1). The processor may be configured to transmit or block at least a portion of the light incident into the housing by applying an electrical signal to the electrophoretic element, and to obtain bio-signal information based on the light received by the sensor module.

According to various embodiments, the electrophoretic element may include an upper electrode film (e.g., the upper electrode film 397*b* in FIG. 6 or FIG. 7), a lower electrode film (e.g., the lower electrode film 397*c* in FIG. 6 or FIG. 7) disposed to face the upper electrode film, a transparent electrode (e.g., the transparent electrodes GC and EC in FIG. 6 or FIG. 7) disposed on at least one of the upper electrode film or the lower electrode film, and electrophoretic particles (e.g., the electrophoretic particles P in FIG. 6) accommodated in a space between the upper electrode film and the lower electrode film. The electrophoretic element may be configured to increase a transmittance for light incident from an outside of the housing by distributing the electrophoretic particles around the transparent electrode (e.g., in the area indicated by 'CA' in FIG. 7), as an electrical signal is applied to the transparent electrode.

According to various embodiments, the sensor module may include at least one light emitting element (e.g., the light emitting element 355*a* in FIG. 5) accommodated in the housing and configured to emit light to an outside of the housing through the rear surface, and at least one photoelectric conversion element (e.g., the photoelectric conversion elements 355*b* and 355*c* in FIG. 5) accommodated in the housing and configured to receive the light incident into the housing through the rear surface.

According to various embodiments, the photoelectric conversion element may be configured to receive light emitted by the light emitting element and reflected by the user's body.

According to various embodiments, the processor may be configured to obtain the bio-signal information based on the light received by the photoelectric conversion element.

According to various embodiments of the disclosure, in providing an optical bio-signal measurement function in a wearable electronic device, the transmittance (e.g., transmittance for at least externally incident light) of an area corresponding to a sensor module may be adjusted using an electrophoretic element. For example, when a bio-signal is not measured, the electrophoretic element may mitigate or prevent visual exposure of the internal structures of an electronic device to the outside by substantially suppressing or blocking light transmission. This may mitigate or prevent degradation of the appearance of the electronic device. In an embodiment, the electrophoretic element may receive an electrical signal and increase the transmittance of the area corresponding to the sensor module. For example, in bio-signal measurement, the electrophoretic element may increase the accuracy of the bio-signal measurement by providing an environment in which the sensor module is capable of receiving a sufficient amount of light (e.g., light reflected by a user's body). Besides, various other effects may be provided, which are directly or indirectly identified from the disclosure.

Although the disclosure has been described by way of example with respect to various embodiments, the various embodiments may be for illustrative purposes only and are not intended to limit the disclosure. It will be apparent to those skilled in the art that various changes may be made in the form and detailed structure of the disclosure, including the appended claims and their equivalents, without departing from the overall scope of the disclosure. For example, the rear plate 393 of FIG. 4 is described as having a structure including the first cover plate 393*a* and the second cover plate 393*b* in the above-described embodiment. However, the first cover plate 393*a* and the second cover plate 393*b* may be formed integrally in actual product manufacturing.

What is claimed is:

1. A electronic device comprising:

a housing configured to be worn on a user's body and comprising a rear surface and a front surface, with the rear surface configured to contact the user's body;

at least one sensor module provided in the housing and configured to receive light incident into the housing through the rear surface; and an electrophoretic element provided at least partially between the rear surface and the at least one sensor module, wherein the electrophoretic element is configured to receive an electrical signal and transmit or block at least a portion of the light incident into the housing.

2. The electronic device of claim 1, wherein the electrophoretic element comprises:

an upper electrode film;

a lower electrode film facing the upper electrode film;

a transparent electrode provided on at least one of the upper electrode film or the lower electrode film; and electrophoretic particles provided in a space between the upper electrode film and the lower electrode film, and wherein the electrophoretic element is further configured to increase a transmittance of light incident from an outside of the housing by distributing the electrophoretic particles around the transparent electrode, based on an electrical signal applied to the transparent electrode.

3. The electronic device of claim 1, further comprising a processor configured to obtain bio-signal information based on the light received by the at least one sensor module.

4. The electronic device of claim 1, wherein the at least one sensor module comprises:

at least one light emitting element provided in the housing and configured to emit light to an outside of the housing through the rear surface; and at least one photoelectric conversion element provided in the housing and configured to receive the light incident into the housing through the rear surface.

5. The electronic device of claim 4, wherein the electrophoretic element is further configured to transmit or block at least a portion of the light emitted by the at least one light emitting element.

6. The electronic device of claim 4, wherein the at least one photoelectric conversion element is further configured to receive light emitted by the at least one light emitting element and reflected by the user's body.

7. The electronic device of claim 6, further comprising a processor configured to obtain bio-signal information based on the light received by the at least one photoelectric conversion element.

8. The electronic device of claim 4, wherein the electrophoretic element comprises:

an upper electrode film;

a lower electrode film facing the upper electrode film;

a transparent electrode provided on at least one of the upper electrode film or the lower electrode film; and electrophoretic particles provided in a space between the upper electrode film and the lower electrode film, and wherein the electrophoretic element is further configured to increase a transmittance of light incident from an outside of the housing and the light emitted by the at least one light emitting element by distributing the electrophoretic particles around the transparent electrode, based on an electrical signal applied to the transparent electrode.

9. The electronic device of claim 1, wherein the housing comprises:

a side bezel structure comprising a metal or a polymer;

a front plate provided on the side bezel structure and providing at least a portion of the front surface; and a rear plate provided on the side bezel structure and providing at least a portion of the rear surface.

10. The electronic device of claim 9, wherein the electrophoretic element is provided on an inner surface of the rear plate.

11. The electronic device of claim 9, further comprising at least one wearing member detachably coupled to the side bezel structure and configured to allow the housing to be worn on the user's body, wherein, when being worn on the user, the rear plate is configured to face or contact the user's body.

12. The electronic device of claim 1, further comprising a processor, wherein the processor is configured to:

determine whether the housing is being worn on the user's body;

based on determining the housing being worn on the user's body, determine whether to measure bio-signal information;

based on determining to measure the bio-signal information, increase a transmittance of light incident into the housing by applying the electrical signal to the electrophoretic element; and detect the light incident into the housing using the at least one sensor module.

13. The electronic device of claim 12, wherein the processor is further configured to block the electrical signal applied to the electrophoretic element, based on determining that the housing is not being worn on the user's body, or based on determining not to measure the bio-signal information.

14. The electronic device of claim 12, wherein the at least one sensor module comprises:

at least one light emitting element provided in the housing and configured to emit light to an outside of the housing through the rear surface; and at least one photoelectric conversion element provided in the housing and configured to receive the light incident into the housing through the rear surface.

15. The electronic device of claim 14, wherein the processor is further configured to obtain the bio-signal information based on the light received by the at least one photoelectric conversion element.

* * * * *